United States Patent [19]

Williams

[11] 3,978,573

[45] Sept. 7, 1976

[54] DEVICE FOR EXTRACTING BUSHINGS FROM A BUSHING SUPPORT

[76] Inventor: Martin D. Williams, 7904 4th St., Maud, Ohio 45069

[22] Filed: June 20, 1975

[21] Appl. No.: 588,856

[52] U.S. Cl. .................................... 29/267; 254/131

[51] Int. Cl.$^2$ .......................................... B23P 19/02

[58] Field of Search ................. 81/3 R; 29/267, 235; 254/131

[56] References Cited

UNITED STATES PATENTS 780,727 1/1905 Pendergast ........................ 29/267 X

*Primary Examiner*—Al Lawrence Smith
*Assistant Examiner*—Roscoe V. Parker
*Attorney, Agent, or Firm*—James W. Pearce; Roy F. Schaeperklaus

[57] ABSTRACT

A bushing removing tool which includes an elongated handle portion and an operative head extending transversely of the handle portion and to one side thereof. A hook projection at an end of the operative head faces away from the handle portion and is engageable with the interior of a tubular bushing while a portion of the operative head remote from the hook projection acts as a fulcrum so that the tool can be swung to cause the hook projection to free the bushing from a bushing support.

3 Claims, 6 Drawing Figures

DEVICE FOR EXTRACTING BUSHINGS FROM A BUSHING SUPPORT

This invention relates to a tool for removing a bushing from a bushing support. More particularly, this invention relates to a tool for removing a bushing from a support for a radius arm of a trailer wheel suspension or the like.

The bushings which support ends of radius arms are ordinarily in restricted locations adjacent wheels and the like so that the bushings cannot be removed with ordinary tools without removal of wheels and disassembly of supports.

An object of this invention is to provide a tool for removing a bushing of a radius arm without removal of wheels and without disassembly of supports.

A further object of this invention is to provide a tool for removing a radius arm bushing which includes a hook portion which engages the interior of the bushing, a fulcrum portion about which the tool can be swung and a handle extending away from the hook portion.

Briefly, this invention provides a tool for removing a tubular bushing from a bushing support which includes an elongated handle and an operative head which extends transversely of the handle. A hook projection is formed in the operative head at a free end thereof and facing away from the handle. The hook projection engages the interior of the bushing at one side thereof while a portion of the operative head acts as a fulcrum engaging the opposite side of the interior of the bushing so that swinging of the handle causes the hook projection to bite into the bushing to cause freeing of the bushing from the bushing support.

The above and other objects and features of the invention will be apparent to those skilled in the art to which this invention pertains from the following detailed description and the drawings, in which.

In the following detailed description and the drawings, like reference characters indicate like parts.

Figure 1:
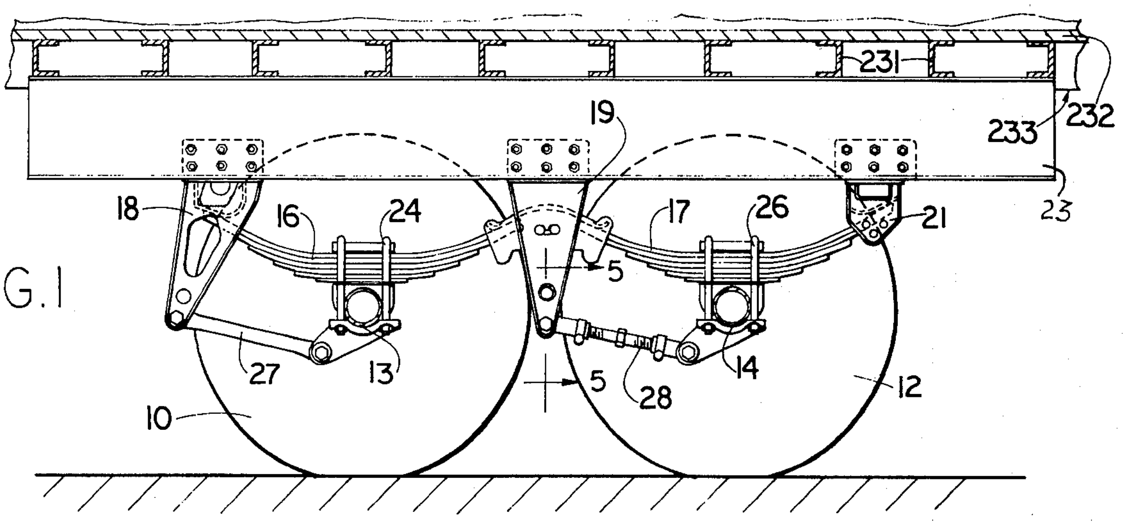
FIG. 1 is a fragmentary view in upright lengthwise section of a trailer showing a portion of a supporting structure therefor.
Figure 5:
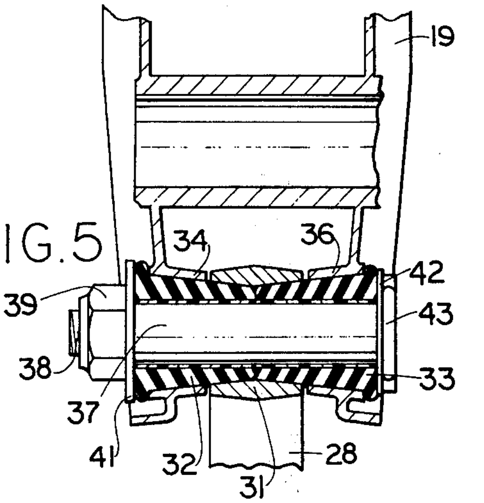
FIG. 5 is a fragmentary view in section taken on an enlarged scale on the line 5—5 in FIG. 1.

In FIG. 1 is shown a pair of tandem arranged wheels 10 and 12 which are mounted in axles 13 and 14, respectively. The axles 13 and 14 support springs 16 and 17, which in turn support brackets 18, 19, and 21. The brackets 18, 19, and 21 are attached to and support a lengthwise frame indicated at 23. The frame 23 and another similar frame, not shown, can be attached to the underside of floor beams 231 which support a floor 232 of a trailer 233, not shown in detail. Spring mounts 24 and 26 are stabilized by radius arms 27 and 28. The radius arm 28 is pivotally connected to the spring mount 26 and to the bracket 19. As shown in FIG. 5, an end portion 31 of the radius rod 28 is tubular to receive portions of tubular bushings 32 and 33. The bushings 32 and 33 are formed of rubber or other rubber-like material and are also received inside tubular portions 34 and 36 of the bracket 19, respectively. A shank 37 of a pivot bolt 38 is received inside the bushings 32 and 33. A nut 29 threaded on the pivot bolt 38 holds a washer 41 against an outer end of the bushing 32. A washer 42 carried by the pivot bolt 38 is held between a head 43 of the pivot bolt 38 and an outer end of the bushing 33. The structure described to this point can be of conventional nature.

Figure 2:
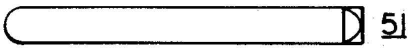
FIG. 2 is an end elevational view of a bushing removing tool constructed in accordance with an embodiment of this invention.
Figure 3:
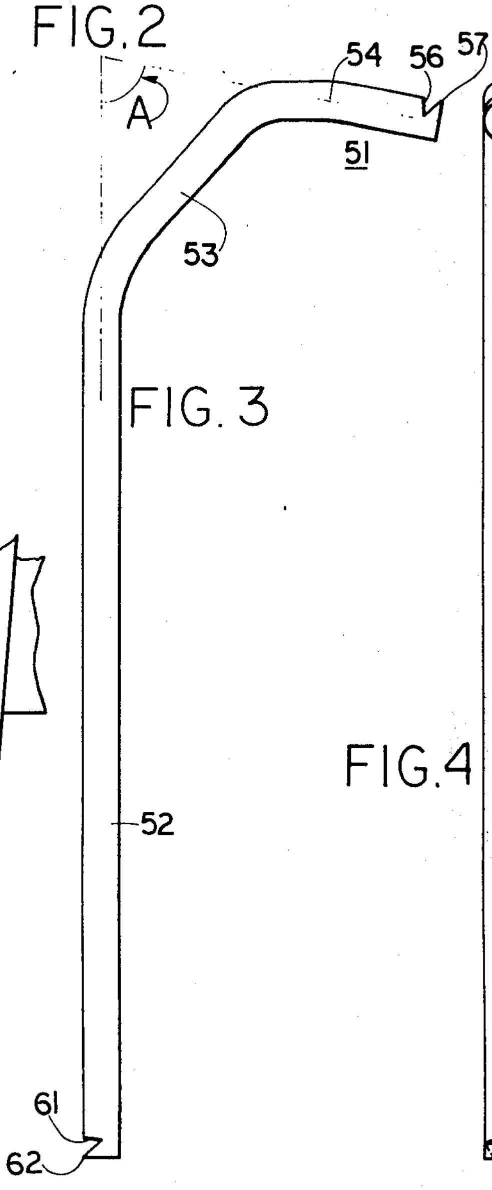
FIG. 3 is a plan view of the tool shown in FIG. 2.
Figure 4:
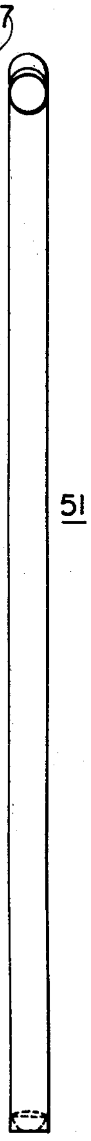
FIG. 4 is a view in side elevation of the tool shown in FIGS. 2 and 3.
Figure 6:
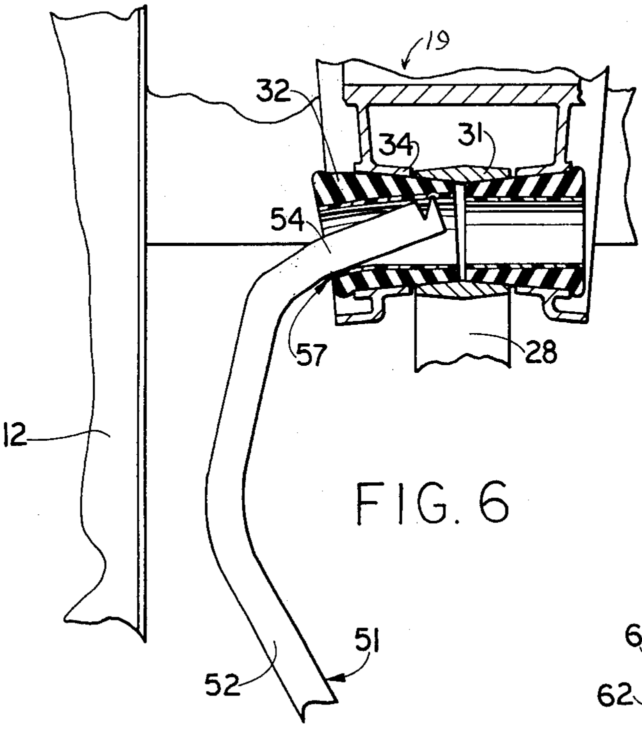
FIG. 6 is a fragmentary view in section taken on the same line as FIG. 5 but showing a radius arm support bearing partially disassembled, a fragmentary portion of the tool of FIGS. 2, 3 and 4 being shown in operative position.

The bushings 32 and 33 require replacement after a period of use. However, as shown in FIGS. 1 and 6, the wheels 10 and 12 are so close to the bracket 19 that it is difficult to remove the bushings 32 and 33 with ordinary tools. In the past, it has been common to require a substantial disassembly operation to make possible removal of the bushings 32 and 33. According to my invention, the bushings 32 and 33 are removed with a tool 51 (FIGS. 2, 3 and 4). The tool 51 can be formed from a single bar of rigid metal and includes a handle portion 52, an intermediate portion 53, and an operating end or head portion 54. The axis of the operating end portion 54 extends at an angle A of approximately 80° to the handle portion 52. A notch 56 is cut in the operating end portion 54 adjacent the free end thereof to define a pointed hook projection 57, which extends away from the handle portion 52. When the pivot bolt 38 (FIG. 5) has been removed, the operating end portion 54 of the tool 51 is inserted into the bushing 32 as shown in FIG. 6, and the handle portion 52 of the tool can be swung to the right as shown in FIG. 6 to cause the hook projection 57 to grip the bushing 32 for prying the upper portion of the bushing 32 to the left to cause the bushing 32 to break loose from the end portion 31 of the radius rod 28 and from the tubular portion 34 of the bracket 19. A side of the operating end portion remote from the hook projection 51 and indicated at 57 serves as a fulcrum about which the tool 51 swings.

The tool can be swung to various positions to permit release of various portions of the bushing 32 without interference with the wheels 10 and 12.

A second notch 61 (FIG. 3) can be formed in the handle portion 52 adjacent the free end thereof to define a second hook projection 62. The hook projection 62 can be used to pry loose a bushing in a less restricted location than the bushing 32.

The tool structure illustrated in the drawings and described above is subject to structural modification without departing from the spirit and scope of the appended claims.

I claim:

1. A device for removing a tubular bushing from a tubular bushing support which comprises a handle portion, and an operative head extending transversely of the handle portion and to one side thereof, the operative head being bar-like with a slot therein to form a hook projection adjacent an end of the operative head and facing away from the handle portion, the hook projection being engageable with the interior of the bushing while a portion of the operative head remote and on an opposed side of the operative head from the hook projection acts as a fulcrum so that the tool can be swung to cause the hook projection to free the bushing from the bushing support.

2. A device as in claim 1 wherein the handle portion is elongated, an intermediate portion connects the handle portion to the operative head, the operative head, the intermediate portion and the handle portion are integral and bar-like, and the axis of the operative head extends at an angle of approximately 80 degrees to the axis of the handle portion.

3. A device as in claim 1 wherein the operative head as a surface area facing away from the handle portion and adjacent said hook portion but spaced therefrom by said slot, a portion of said surface area tending to cooperatively engage the bushing when the operative head is near parallel relation to the bushing surface engaged by said hook under an operating force applied to said handle and the portion of said surface area engaging said bushing decreasing as said operating head nears perpendicular relation to the bushing surface engaged by said hook under said operating force applied to said handle.

* * * * *